United States Patent [19]
Reichert et al.

[11] Patent Number: 6,122,801
[45] Date of Patent: Sep. 26, 2000

[54] HINGE MECHANISM

[75] Inventors: Armin Reichert, Nürnberg; Karl-Heinz Rademacher, Schwarzenbruck, both of Germany

[73] Assignee: Telefonaktiebolaget LM Ericsson, Stockholm, Sweden

[21] Appl. No.: 09/086,513

[22] Filed: May 28, 1998

[51] Int. Cl.[7] ................................... E05F 1/14
[52] U.S. Cl. ................... 16/284; 16/328; 16/303
[58] Field of Search ............... 16/284, 285, 330, 16/328, 303, 304, 308, 341, 385

[56] References Cited

U.S. PATENT DOCUMENTS

| | | | |
|---|---|---|---|
| 3,895,413 | 7/1975 | Buergers | 16/382 |
| 5,274,882 | 1/1994 | Persson | 16/303 |
| 5,398,378 | 3/1995 | Lin | 16/303 |
| 5,628,089 | 5/1997 | Wilcox et al. | 16/303 |
| 5,640,690 | 6/1997 | Kurdrna | 16/337 |
| 5,678,206 | 10/1997 | Ishii | 16/342 |
| 5,697,124 | 12/1997 | Jung | 16/341 |
| 5,704,094 | 1/1998 | Hartigan et al. | 16/303 |
| 5,715,576 | 2/1998 | Liu | 16/303 |

FOREIGN PATENT DOCUMENTS

| | | |
|---|---|---|
| WO90/05421 | 5/1990 | WIPO . |
| WO92/17973 | 10/1992 | WIPO . |
| WO92/20181 | 11/1992 | WIPO . |
| WO93/18592 | 9/1993 | WIPO . |
| WO96/17463 | 6/1996 | WIPO . |

*Primary Examiner*—Chuck Y. Mah
*Attorney, Agent, or Firm*—Burns, Doane, Swecker & Mathis, L.L.P.

[57] ABSTRACT

A hinge mechanism in provided with a first hinge portion, a second hinge portion, and a third hinge portion coupled to said first hinge portion. The third hinge portion includes a first end and a second end. A first axle is coupled to the first end of the third hinge portion. A second axle is coupled and locked to the second end of the third hinge portion. A compressible resilient device is abutted to the second axle. The second hinge portion is coupled to the third hinge portion via the first axle and the second axle. The second axle comprises an engaging member and the third hinge portion comprises a groove, wherein the engaging member mates with the groove.

22 Claims, 5 Drawing Sheets

HINGE MECHANISM

BACKGROUND

This invention relates to a hinge mechanism for holding hinge portions in predetermined positions relative to one another, and more particularly to a hinge mechanism capable of urging hinge portions toward predetermined positions when the hinge portions are in intermediate positions between the predetermined positions.

Typical hinge mechanisms consist of a pair of hinge portions, each formed with some structure for receiving an axle, such as a bore, a recess, or an eyelet, and an axle passing through the axle receiving structures of the hinge portions and permitting the hinge portions to rotate relative to one another about the axis formed by the axle. In certain applications, it has been found desirable to use hinge mechanisms having hinge portions capable of being held in particular, predetermined angular relationships relative to one another. It has also been found desirable to use hinge mechanism having hinge portions that are urged to assume particular, predetermined angular relationships relative to one another when the hinge portions are not already being held in those angular relationships. Such applications include spring loaded, automatically closing refrigerator doors, gravity hinges of the type occasionally used in so-called "cafe doors," and multiple position hinges, such as used in some mounting frames.

In hinge mechanisms of the type with which the present invention is concerned, first and second hinge portions are urged toward predetermined angular relationships relative to one another and held in those relationships by male and female engaging members associated with first and second hinge portions. Often, the male engaging member is a rod having V-shaped tips and the female engaging member is a V-shaped groove. For example, the male engaging member may be adapted to be axially movable and non-rotatable within one hinge portion, and axially movable and rotatable relative to, and engageable with, the female engaging member on the other hinge portion. In such hinge mechanisms, the female engaging member is non-rotatable and not axially movable relative to the other hinge portion. A spring is provided to urge the male engaging member against the female engaging member such that, when the male and female engaging members are aligned, the hinge portions are held at predetermined angular relationships relative to one another.

Typically, male and female engaging members are arranged on hinge portions such that alignment of the male and female engaging members occurs when the hinge portions are in an angular relationship relative to each other that corresponds to a door closed, a door fully open, or any other desired condition. When V-shaped male and female engaging members are used, there will generally be two hinge portion positions, separated by 180°, wherein the engaging members are aligned with one another.

When the male and female engaging members are not aligned, it is possible to cause them to tend toward alignment by providing a spring of sufficient force to overcome frictional forces between the unaligned male and female engaging members.

For example, in U.S. Pat. No. 5,640,690 to Kudrna, a cover is rotated, with respect to a housing, from an open to a closed position by use of two hinge pins, each having identical cam surfaces. The two hinge pins are separated by a spring and are inserted into a hinge arm. The hinge arm is attached to the cover and the cover may not be removed without disassembling the hinge assembly. In addition, since the hinge arm is attached to the cover, a microphone is not easily placed within the hinge area. Instead, a microphone will be placed above the hinge arm in order for it to be unobstructed by the cover or the hinge arm while the cover is in an open position. In addition, pre-assembly of the cover and hinge components separate from the housing is difficult since the spring member will force the two hinge pins out the hinge arm when the door is not attached to the housing.

SUMMARY

In accordance with one aspect of the present invention, a hinge mechanism includes few components and provides for easy replacement of a moveable hinge portion.

A hinge mechanism is provided with a first hinge portion, a second hinge portion, and a third hinge portion coupled to the first hinge portion, the third hinge portion having a first end and a second end. A first axle is coupled to the first end of the third hinge portion. A second axle is coupled and locked to the second end of the third hinge portion. A compressible resilient device is abutted to the second axle. The second hinge portion is coupled to the third hinge portion via the first axle and the second axle.

In an exemplary embodiment of the present invention, the second axle comprises an engaging member and the third hinge portion comprises a groove, wherein the engaging member mates with the groove.

In another exemplary embodiment of the present invention, the first axle is made of a higher wear resistant material than the second hinge portion.

In another exemplary embodiment of the present invention, the first axle is made of a wear resistant, low friction material, e.g., acetal resin.

In another exemplary embodiment of the present invention, the third hinge portion has a first hollow portion having a first diameter and a second hollow portion having a second diameter. The first axle is located in the first hollow portion and the compressible resilient device and the second axle are both located in the second hollow portion.

In another exemplary embodiment of the present invention, the second hinge portion comprises a first recess and a second recess. At least one of the first recess and the second recess comprises a rib. The second axle comprises a functional curve. Alternatively, the second axle comprises a rib and a corresponding recess in the second hinge portion comprises a functional curve.

BRIEF DESCRIPTION OF THE DRAWINGS

The features and advantages of the present invention will be well understood by reading the following detailed description in conjunction with the drawings in which like numerals indicate similar elements and in which.

DETAILED DESCRIPTION

Figure 1:
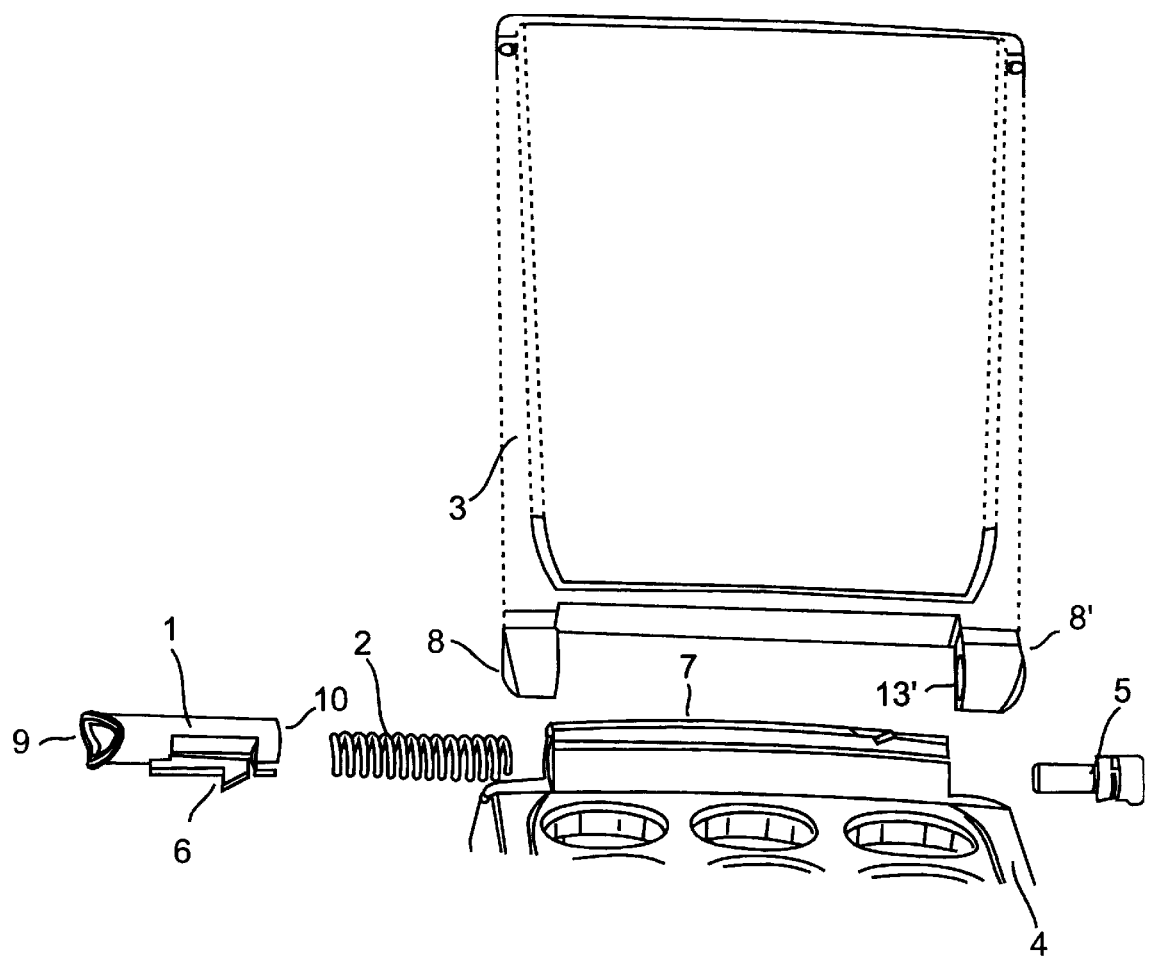
FIG. 1 is an exploded perspective view of an embodiment of the present invention.

With reference to FIG. 1, an embodiment of a hinge mechanism includes a first hinge portion 4, e.g., a housing, a second hinge portion 3, e.g., a door or a flap, a first cap portion 8, a second cap portion 8', a cam axle 1, an end axle 5, a hinge sleeve 7 coupled to the first hinged portion 4, and a compressible, resilient member 2 forcing the cam axle 1 outwardly from the hinge sleeve 7. The cam axle 1 includes two sides, the cam side 9 and the flat side 10. It will be recognized by one skilled in the art that end axle 5 may, alternatively, be integral with hinge sleeve 7.

In the hinge mechanism shown in FIG. 1, a compressible resilient member 2 abuts the flat side 10 of the cam axle 1 for forcing the cam axle 1 outwardly relative to the hinge sleeve 7. FIG. 1 shows a compressible resilient member 2 consisting of a coil spring, but any suitable, compressible, resilient device may be used, including, for example, bar springs and foam rubber. In an exemplary embodiment of the present invention, force applied by the resilient member is approximately 10 N. The compressible resilient member 2 also abuts a wall of a narrow portion 14, i.e., a portion within the hinge sleeve 7 with a smaller diameter than the compressible resilient member 2.

Figure 2:
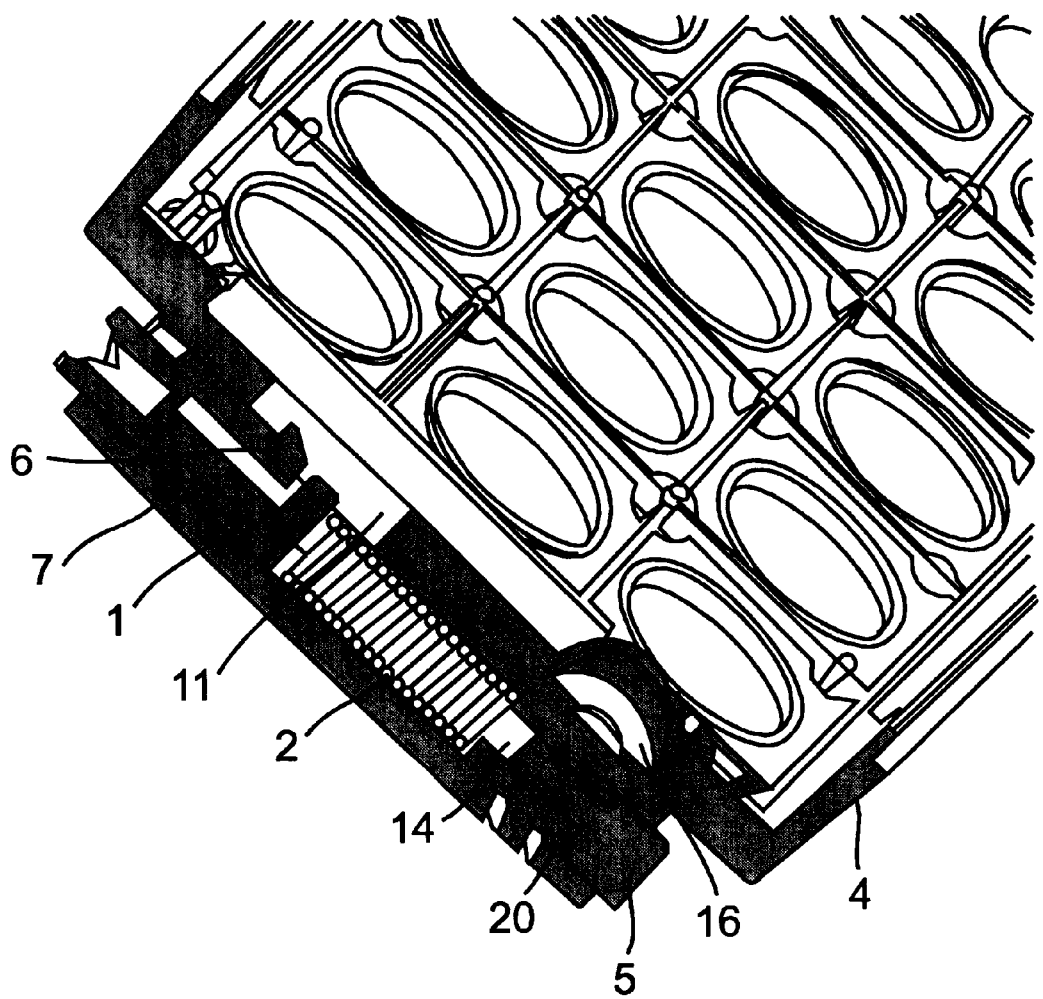
FIG. 2 is a cross-sectional view of an embodiment of the present invention.
Figure 3:
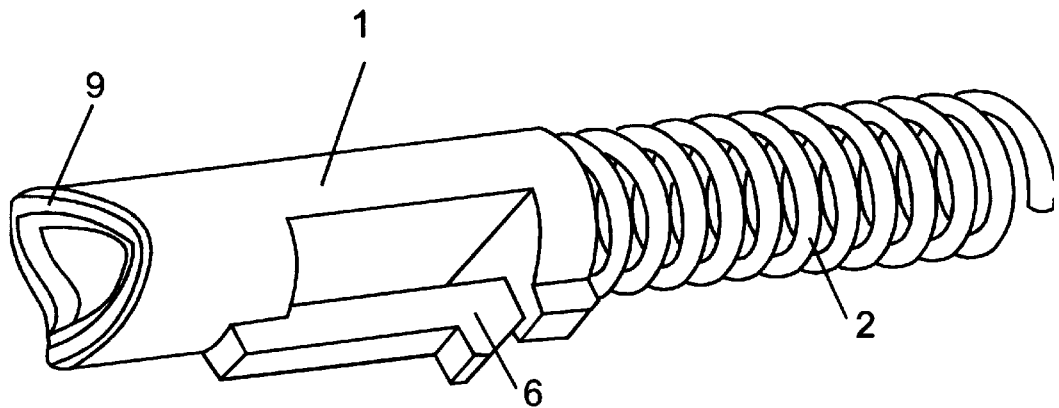
FIG. 3 is a perspective view of a cam axle and a compression member according to an embodiment of the present invention.

With reference to FIGS. 1–3, cam axle 1 includes an engaging member 6, e.g., a snap hook, which engages with a groove 11 which is located within the hinge sleeve 7. When the engaging member 6 is mated with the groove 11, the cam axle is prevented from outward and rotational movement with respect to the hinge sleeve 7. It will be understood to one skilled in the art that other engaging mechanisms can be used so long as the cam axle 1 is locked into place, i.e., prevented from outward and rotational movement with respect to the hinge sleeve 7.

Figure 4:
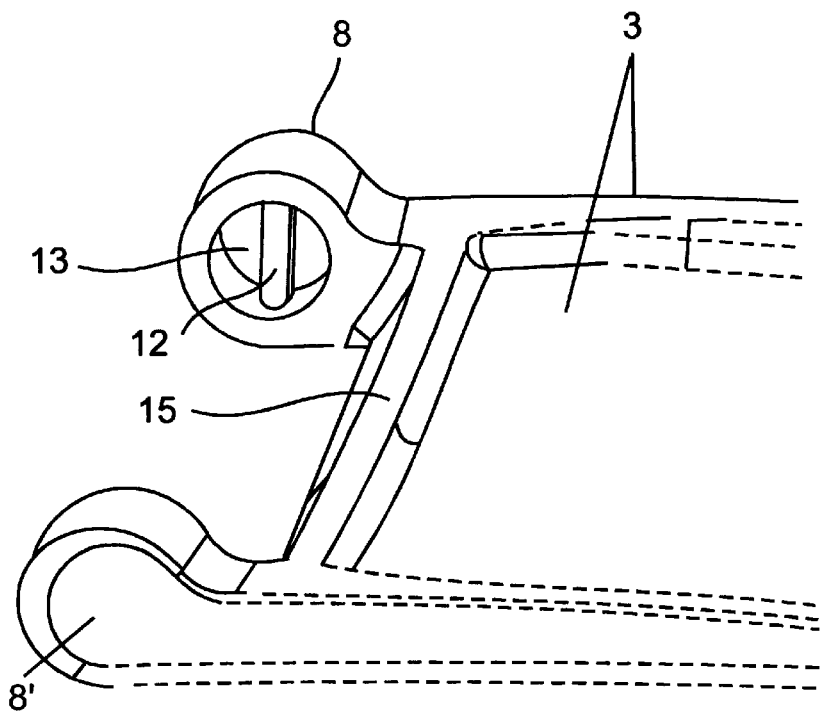
FIG. 4 is a perspective view of a hinge member of an embodiment of the present invention.

With reference to FIG. 4, the second hinge portion 3 includes a first cap portion 8 and a second cap portion 8'. The first cap portion 8 includes a cam hole 13 and the second cap portion 8' includes an end hole 13' (FIG. 1), for receiving the exposed ends of the cam axle 1 and the end axle 5 while the axles are fixed in hinge sleeve 7. A rib 12 is located within the cam hole 13 which engages with the cam side 9 of the cam axle 1. Since the end axle 5 is flat on both ends, a rib is not required in the end hole 13' for successful operation. However, a second rib may be located within the end hole 13' to abut the end axle 5. The second hinge portion 3 also includes a support member 15 which is coupled to both ends of first and second cap portions 8, 8'. Support member 15 provides structural support to the second hinge portion in order to help prevent destructive elastic forces on first and second cap portions 8, 8'. Although illustrated in another way, in an alternate embodiment of the present invention, the cam axle includes a rib which engages with a cam side having a functional curve located in the first cap portion.

With respect to FIGS. 1–4, in an exemplary embodiment of the present invention, the cam axle 1 and optionally, the end axle 5 are made of a material which has a higher fatigue or wear resistance than the second hinge portion 3 and first and second cap portions 8, 8'. In another exemplary embodiment of the present invention, the cam axle 1 and, optionally, the end axle 5 are made of a material with excellent fatigue resistance as well as a low coefficient of friction, such as a polyoxymethylene (POM) material. An example of a POM material is acetal resin containing TEFLON fibers, such as is available from DUPONT under the trade name DELRIN 500 AF.

It will be understood to one skilled in the art, that the material used in the construction of the present invention will depend, in part, on the intended use of the hinge mechanism. Materials such as, but not limited to, metals, composites, plastics, and woods, can be used in the construction of the hinge mechanism of the present invention.

It will also be understood to one skilled in the art, that the present invention can be a component of a personal mobile device, wherein the first hinge portion is a mobile housing and the second hinge portion is a door or a flap. For example, the present invention can be used in conjunction with a cellular telephone, two-way radio, cordless telephone, or any other personal communication device.

The assembly of the hinge mechanism of the present invention will be described with respect to FIGS. 1–4. First, the end axle 5 is pressed into one end of the hinge sleeve 7. Next, the compressible resilient device 2 is pushed into the other end of hinge sleeve 7. The cam axle 1 is then pushed into hinge sleeve 7 until the engaging member 6 locks into place with the groove 11. The use of the engaging member 6 and groove 11 simplifies the assembly of the present invention since it prevents the cam axle 1 from being forced out of the hinge sleeve 7. The second hinge portion 3 is then coupled to the first hinge portion 4 by pressing the cam hole 13 of the first cap portion 8 on the cam axle 1 and pulling the end hole 13' of second cap portion 8' over the end axle 5.

In an exemplary embodiment of the present invention, the second hinge portion 3 is coupled to the first hinge portion 4 at a time separate from the assembly of the end axle 5, compressible resilient device 2, and the cam axle 1 into the hinge sleeve 7. The second hinge portion 3 can also be attached to the first hinge portion 4 at a different location than the above assembly. For example, a first hinge portion 4, with a preassembled hinge sleeve 7 as described above, can be shipped to various vendors who can then attach their own second hinge portion 3 which can include the vendor's logo or can be of a specific color.

In addition, removal and replacement of the second hinge portion 3 is a very easy and simple process and can be performed without the disassembly of the cam axle 1, compressible resilient device 2, and the end axle 5. This is due, in part, to the attachment of the hinge sleeve 7 to the first hinge portion 4, i.e., the housing (in contrast to the attachment of the hinge to the flap in U.S. Pat. No. 5,640, 690). The design of the second hinge portion 3 is such that it allows a small amount of elasticity, e.g., 0.3 mm. In addition, unlike the design of the hinge described in U.S. Pat. No. 5,640,690, the design of the second hinge portion 3 allows for a portion of the space occupied by the hinge sleeve 7 to be used for other devices, e.g., a microphone 16.

With the second hinge portion 3 in an open position, the second hinge portion 3 can be removed by first asserting a force on the first cap portion 8 such that the compressible resilient device 2 is compressed an additional length, e.g., 0.5 mm. The end hole 13' is then removed from the end axle 5 by applying an additional force in order to temporarily distort (e.g., by 0.3 mm) the second cap portion 8' and the second hinge portion 3 in order to clear the end axle 5. Once the second cap portion 8' is removed from the end axle 5, the first cap portion 8 can then be slid off the cam axle 1, thereby removing the second hinge portion 3 from the first hinge portion 4. A new second hinge portion can be coupled to the first hinge portion 4 by pressing the cam hole 13 of the new first cap portion on the cam axle 1 and pulling the end hole of the new second cap portion over the end axle 5.

Figure 8:
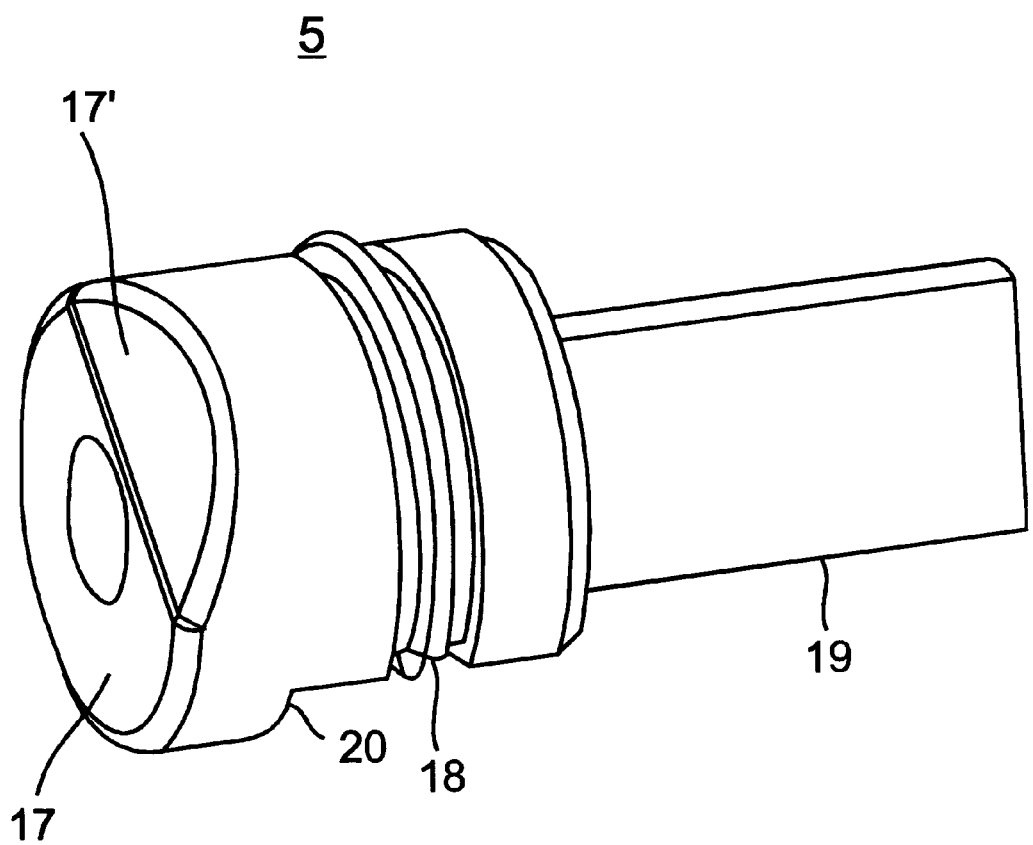
FIG. 8 is a perspective view of an end axle according to an embodiment of the present invention.

FIG. 8 illustrates the end axle 5 according to an exemplary embodiment of the present invention. The end axle 5 includes an outer surface 17, an angled (or sloped) outer surface 17', a lip portion 18, and a shaft portion 19. When the end axle 5 is inserted into hinge sleeve 7 by inserting the shaft portion 19 into an end of the sleeve portion, the lip portion 18 helps to provide frictional force between the end axle 5 and the hinge sleeve 7. The outer surface 17 and the angled outer surface 17' have a diameter which is greater than the diameter of the remaining portions of the end axle 5. That is, when end axle 5 is inserted into narrow portion 14 (shown in FIG. 2) of hinge sleeve 7, the wall 20, formed by the junction of two portions having different diameters, abuts the outer wall of narrow portion 14.

The angled outer surface 17' and outer surface 17 assist in the assembly of the second hinge portion 3 by providing a slightly lower clearance required by the second cap portion 8' of the end axle 5. That is, the force applied to temporarily distort the second cap portion 8' in order to clear the end axle 5 will only have to be enough to clear the angled outer surface 17'. Once the angled outer surface 17' is cleared, then by sliding the second cap portion along the angled outer surface 17', the shape of the angle will assist in the additional distortion necessary to clear the remaining outer surface 17. The location of the wall 20 assists in the proper alignment of the end axle 5 such that the angled outer surface 17' is located in such a place so as to direct the second cap portion 8' toward the hinge sleeve 7.

It will be understood by one skilled in the art that an additional angled surface can assist in the disassembly of the second hinge portion as well. In addition, the end axle 5 can have multiple angled surfaces of varying slopes or the outer surface 17 can be entirely sloped, e.g., a cone or a sphere.

Figure 5:
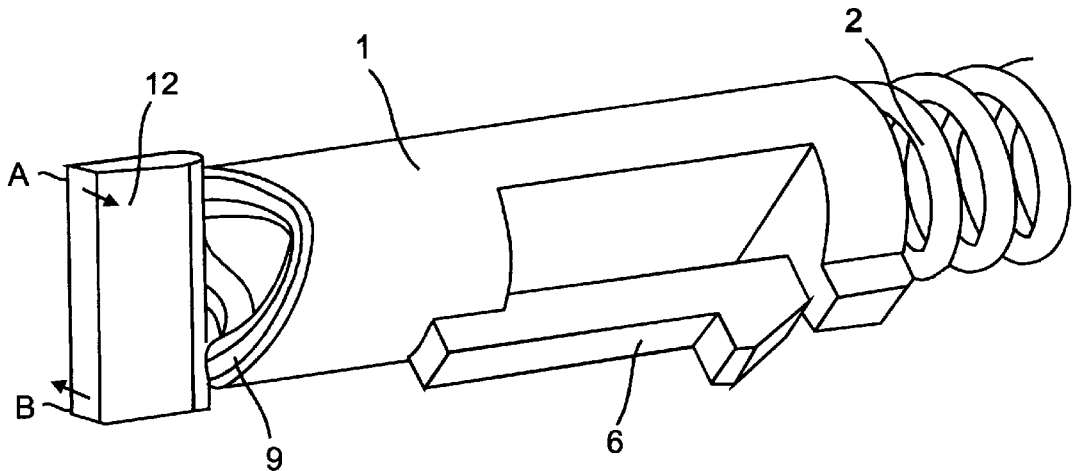
FIG. 5 is a perspective view of a cam axle, a compression member, and a rib in a closed position according to an embodiment of the present invention.

The operation of the hinge mechanism of the present invention will be described with respect to FIGS. 5–7 where A and B help illustrate the position of rib 12 which is attached to the second hinge portion 3 via first cap portion 8. The shape of cam side 9 provides at least one resting position for the second hinge portion. In the exemplary embodiment shown in FIGS. 5 and 7, two resting positions are available, e.g., an open position (FIG. 7) and a closed position (FIG. 5). One skilled in the art will recognize that any number of resting positions may be available depending on the needs and preferences of the user and the particular application of the present invention.

FIG. 5 illustrates the second hinge portion 3 in a closed position, e.g., 0°, with respect to the first hinge portion 4 (the rib 12 abuts the peaks of the cam side 9, but is slightly biased toward the closed position). FIG. 6 illustrates the second hinge portion 3 in an intermediate position between the open and closed positions, e.g., 30°–130° (the rib 12 abuts a portion of the cam side 9 which is between the peaks and valleys and is biased toward the open position). FIG. 7 illustrates the second hinge portion 3 in an open position, e.g., 130°, with respect to the first hinge portion 4 (the rib 12 abuts the valleys of the cam side 9). The peak point(s) of the functional curve define(s) the angle(s) at which the second hinge portion 3 can open/close by itself.

It will be understood to one skilled in the art, that the angles selected for the various positions can be adjusted based on the size of the embodiment of the present invention and also based on user preference.

The shape of cam side 9, with the peaks at, e.g. 30°, allows for a user to switch the position of the second hinge portion 3 relative to the first hinge portion 4 with minimal force, e.g., with the use of a single finger. The amount of force required to move the second hinge portion 3 is related to the shape of the cam side 9. That is, the cam end 3 contains a functional or steering curve having peaks and valleys.

In an exemplary embodiment of the present invention, when the peaks and valleys are steep, more force is needed to move the second hinge portion 3 from a closed position to an open position. Alternatively, when the peaks and valleys are gradual, less force is needed to move the second hinge portion 3 from a closed position to an open position. The desired force can be achieved based on user preference for tactile feeling. The tactile feeling can be controlled by the force requirement to open and close the second hinge portion. In addition, the force requirement can be adjusted by the strength of the compressive resilient device 2.

Figure 6:
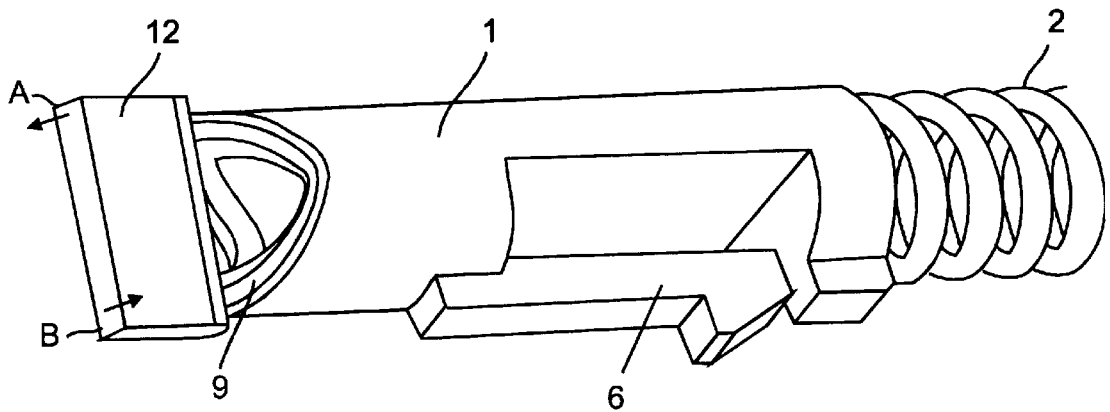
FIG. 6 is a perspective view of a cam axle, a compression member, and a rib in an intermediate position according to an embodiment of the present invention.
Figure 7:
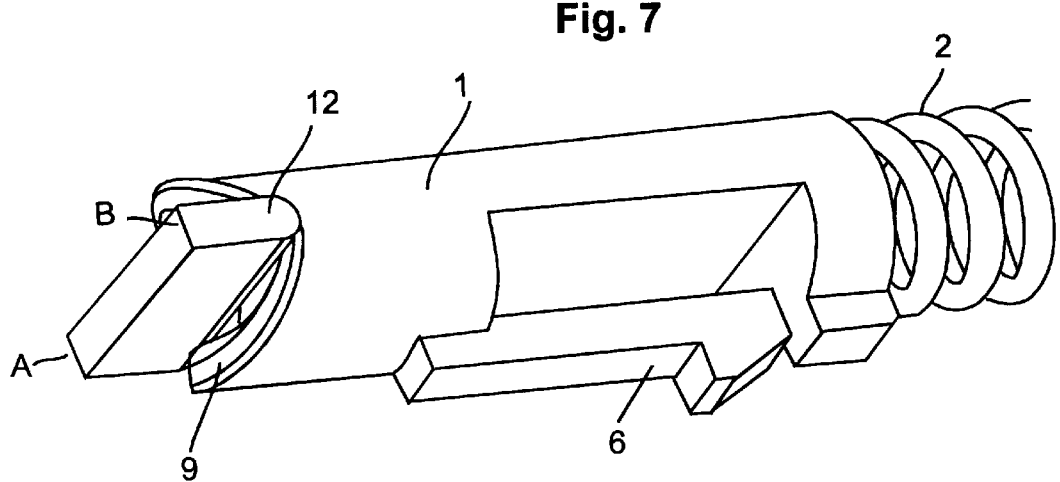
FIG. 7 is a perspective view of a cam axle, a compression member, and a rib in an open position according to an embodiment of the present invention.

The exemplary embodiment of the present invention as illustrated in FIGS. 5 and 6 show the direction of the torque applied to the rib 12 and the cam side 9. When the second hinge portion is at an angle of, e.g., 0°–30°, the direction of the torque is toward the closed position. When the second hinge portion is at an angle of, e.g., 30°–130°, the direction of the torque is toward the open position. In addition, when the second hinge portion is at an angle of, e.g., 130°–180°, the direction of the torque is back toward the open position, i.e., back to, e.g., 130°.

While the present invention has been described in connection with the exemplary embodiments shown in the various figures, it is to be understood that other similar embodiments may be used and modifications and additions may be made to the described embodiments for performing the same function of the present invention with deviating therefrom. The scope of the invention is given in the appended claims, rather than the preceding description, and all variations and equivalents which fall within the range of the claims are intended to be embraced therein.

What is claimed is:

1. A mechanism comprising:

a hinge portion including a groove, said hinge portion having a first end and a second end arranged along an axis;

a first axle coupled to said first end of said hinge portion;

a second axle coupled and locked to said second end of said hinge portion, wherein said second axle includes an engaging member that mates with said groove; and a compressible resilient device in abutment with said second axle, wherein said second axle is substantially prevented from outward movement away from said first end and said second end along said axis and rotational movement with respect to said hinge portion.

2. The mechanism of claim 1, further comprising:

a second hinge portion;

wherein said second hinge portion is coupled to said hinge portion via said first axle and said second axle.

3. The mechanism of claim 2, wherein said second axle has a higher wear resistance than said second hinge portion.

4. The mechanism of claim 2, wherein said second axle has a lower coefficient of friction than said second hinge portion.

5. The mechanism of claim 2, wherein said second hinge portion includes a recess.

6. The mechanism of claim 2, wherein said second hinge portion includes a rib.

7. The mechanism of claim 2, wherein said second hinge portion defines a functional curve.

8. The mechanism of claim 1, wherein said second axle is made of an acetal resin.

9. The mechanism of claim 1, wherein said hinge portion includes a first hollow portion having a first diameter and a second hollow portion having a second diameter.

10. The mechanism of claim 9, wherein said first axle is located in said first hollow portion and said compressible resilient device and said second axle are both located in said second hollow portion.

11. The mechanism of claim 1, wherein said second axle defines a functional curve.

12. The mechanism of claim 1, wherein said first axle includes at least one angled surface.

13. A portable apparatus having a hinge mechanism comprising:

a housing;

a flap;

a hinge portion including a groove, said hinge portion having a first end and a second end arranged along an axis;

a first axle coupled to said first end of said hinge portion;

a second axle coupled and locked to said second end of said hinge portion, wherein said second axle includes an engaging member that mates with said groove; and a compressible resilient device in abutment with said second axle, wherein said flap and said housing are coupled to said hinge portion via said first axle and said second axle, wherein said second axle is substantially prevented from outward movement away from said first end and said second end along said axis and rotational movement with respect to said hinge portion.

14. The portable apparatus of claim 13, wherein said first axle and said second axle are made of an acetal resin.

15. The portable apparatus of claim 13, wherein said second axle has a higher wear resistance than said flap.

16. The portable apparatus of claim 15, wherein said second axle has a lower coefficient of friction than said flap.

17. The portable apparatus of claim 13, wherein said hinge portion includes a first hollow portion having a first diameter and a second hollow portion having a second diameter.

18. The portable apparatus of claim 17, wherein said first axle is located in said first hollow portion and said compressible resilient device and said second axle are both located in said second hollow portion.

19. The portable apparatus of claim 13, wherein said flap includes a recess.

20. The portable apparatus of claim 13, wherein at least one of said flap and said second axle includes a rib.

21. The portable apparatus of claim 13, wherein one of said flap and said second axle defines a functional curve.

22. The portable apparatus of claim 13, wherein said first axle includes at least one angled surface.

* * * * *